(12) United States Patent
Sharifi Mehr

(10) Patent No.: US 11,916,895 B1
(45) Date of Patent: Feb. 27, 2024

(54) CERTIFICATE AUTHORITY BREACH DETECTION FOR NETWORK-CONNECTED DEVICES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 302 days.

(21) Appl. No.: 16/178,403

(22) Filed: Nov. 1, 2018

(51) Int. Cl.
*H04L 29/06* (2006.01)
*H04L 9/40* (2022.01)

(52) U.S. Cl.
CPC ...... *H04L 63/0823* (2013.01); *H04L 63/1425* (2013.01)

(58) Field of Classification Search
CPC ............... H04L 63/0823; H04L 9/3268; H04L 63/1425; H04L 63/1416; H04L 9/3247; H04L 63/1408; H04L 63/145; H04L 63/1466; H04L 63/1433; H04L 43/16; G06F 21/64; G06F 21/33; G06F 21/44; H04W 12/06; G06N 20/00; G06N 7/005; G06N 20/20; G06N 3/08
USPC ...... 726/2, 10, 13, 22, 25–27; 713/155–158, 713/175–176; 707/736–737
See application file for complete search history.

(56) References Cited

U.S. PATENT DOCUMENTS

| | | | | |
|---|---|---|---|---|
| 7,690,037 | B1* | 3/2010 | Hartmann | H04L 63/1416 726/25 |
| 7,801,896 | B2* | 9/2010 | Szabo | G06Q 30/0247 707/715 |
| 8,429,734 | B2* | 4/2013 | Agbabian | H04L 63/166 726/19 |
| 8,645,697 | B1* | 2/2014 | Emigh | H04L 9/3268 713/176 |
| 10,708,256 | B1* | 7/2020 | Kane-Parry | H04L 63/0823 |
| 10,771,261 | B1* | 9/2020 | Lazar | H04L 9/3268 |
| 2006/0015729 | A1* | 1/2006 | Novack | H04L 63/0823 713/173 |
| 2006/0155855 | A1* | 7/2006 | Hamai | H04L 63/0823 709/227 |

(Continued)

OTHER PUBLICATIONS

Seif, "The 5 Clustering Algorithms Data Scientists Need to Know," TowardsDataScience.com, dated Feb. 5, 2018, retrieved Sep. 24, 2018 from <https://towardsdatascience.com/the-5-clustering-algorithms-data-scientists-need-to-know-a36d136ef68>, 9 pages.

(Continued)

*Primary Examiner* — Khalid M Almaghayreh
(74) *Attorney, Agent, or Firm* — Davis Wright Tremaine LLP

(57) ABSTRACT

A network-connected device service receives a request to authenticate a network-connected device. The network-connected device service determines, from a digital certificate identified in the request, a set of parameters of the digital certificate. The network-connected device service utilizes the set of parameters to identify, from a set of digital certificate clusters, a digital certificate cluster associated with the set of parameters. Through an audit of the digital certificate clusters, the network-connected device service determines whether the digital certificate cluster is indicative of the digital certificate being anomalous.

22 Claims, 8 Drawing Sheets

(56) References Cited

U.S. PATENT DOCUMENTS

| | | | |
|---|---|---|---|
| 2007/0098266 A1* | 5/2007 | Chiu | G06F 16/58 |
| | | | 707/E17.026 |
| 2011/0258435 A1* | 10/2011 | Bellur | H04L 63/0823 |
| | | | 713/169 |
| 2013/0265167 A1* | 10/2013 | Tilly | H04W 12/069 |
| | | | 340/602 |
| 2013/0304710 A1* | 11/2013 | Nachev | G06F 16/30 |
| | | | 707/690 |
| 2015/0271144 A1* | 9/2015 | Ronca | H04L 9/0891 |
| | | | 713/168 |
| 2015/0363551 A1* | 12/2015 | Cezar | G01N 33/569 |
| | | | 506/4 |
| 2016/0006749 A1* | 1/2016 | Cohen | G06Q 40/12 |
| | | | 726/23 |
| 2016/0044056 A1* | 2/2016 | Boggs | H04W 12/12 |
| | | | 726/23 |
| 2016/0191551 A1* | 6/2016 | Beauchesne | H04L 63/1425 |
| | | | 726/23 |
| 2017/0124478 A1* | 5/2017 | Baradaran | H04L 63/1425 |
| 2017/0339168 A1* | 11/2017 | Balabine | G06F 16/951 |
| 2018/0004759 A1* | 1/2018 | Arrouye | G06F 16/24578 |
| 2018/0006827 A1* | 1/2018 | Naik | H04L 9/3268 |
| 2019/0372882 A1* | 12/2019 | Imai | H04L 67/10 |
| 2020/0007533 A1* | 1/2020 | Ovcharik | H04L 63/0435 |
| 2020/0112515 A1* | 4/2020 | Brar | H04L 63/10 |
| 2020/0112571 A1* | 4/2020 | Koral | G06N 3/08 |

OTHER PUBLICATIONS

Kent, S., "Privacy Enhancement for Internet Electronic Mail: Part II: Certificate-Based Key Management," Network Working Group, Request for Comments: 1422, Feb. 1993, 32 pages.

Cooper, M., et al., "Internet X.509 Public Key Infrastructure: Certification Path Building," Request for Comments: 4158, Informational, Sep. 2005, 81 pages.

Cooper, D., et al., "Internet X.509 Public Key Infrastructure Certificate and Certificate Revocation List (CRL) Profile," Request for Comments: 5280, Standards Track, 141 pages.

* cited by examiner

US 11,916,895 B1

CERTIFICATE AUTHORITY BREACH DETECTION FOR NETWORK-CONNECTED DEVICES

BACKGROUND

As network-connected devices become more prolific, the need to establish and maintain connectivity with these network-connected devices creates challenges for maintaining security. For example, a breach of a certificate authority may enable the malicious installation of inauthentic digital certificates to multiple network-connected devices, potentially leading to the exfiltration of sensitive data. Detecting and responding to such breaches to protect data can involve significant resources, especially given the growing number of network-connected devices that communicate over networks.

BRIEF DESCRIPTION OF THE DRAWINGS

Various techniques will be described with reference to the drawings, in which.

DETAILED DESCRIPTION

Figure 1:
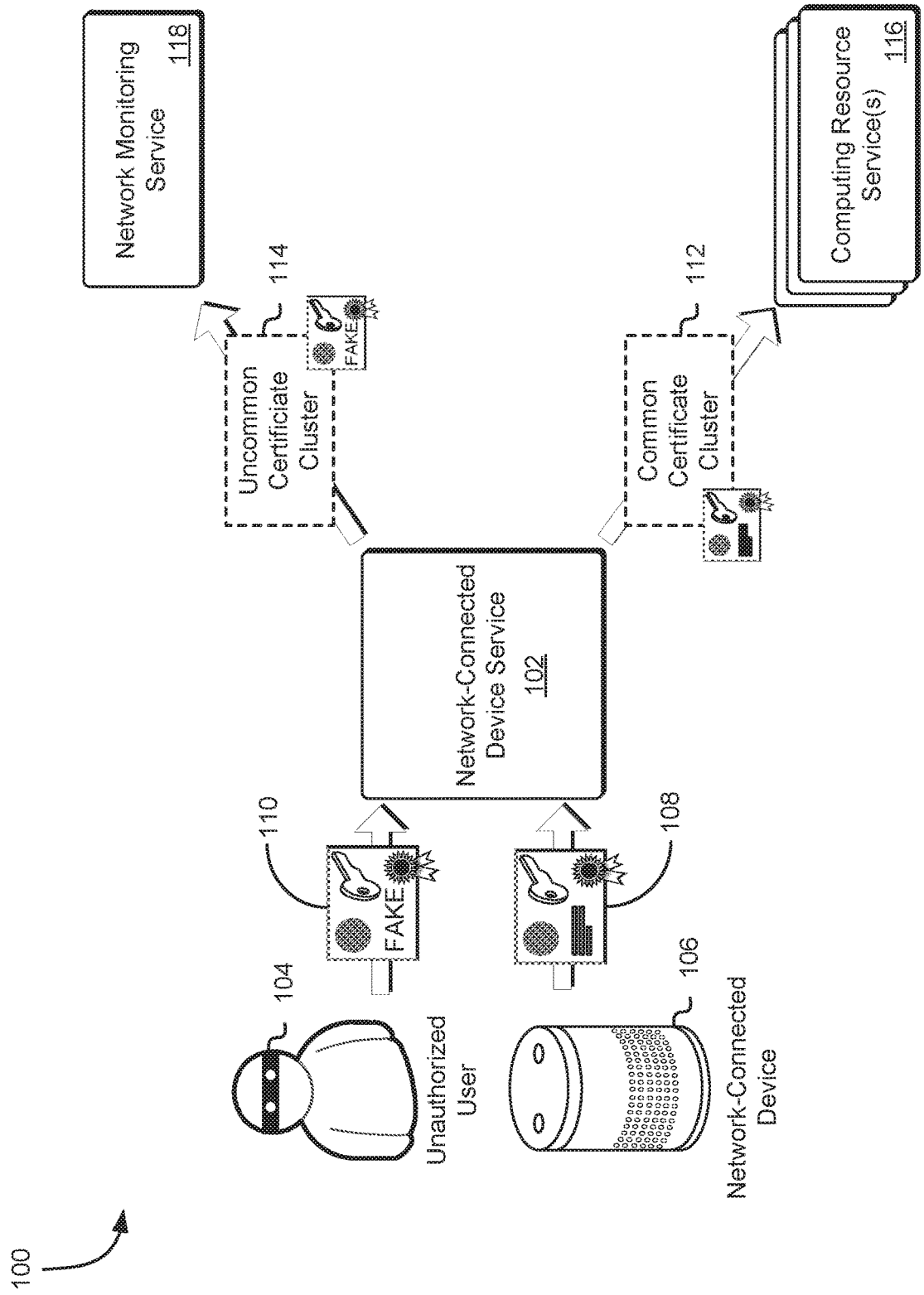
FIG. 1 shows an illustrative example of a system in which various embodiments can be implemented.

Techniques described and suggested herein relate to the creation of digital certificate clusters of characteristic profiles for issued digital certificates to identify the appearance of small clusters which may indicate unauthorized issuance of digital certificates. In an example, a network-connected device service receives, from a network-connected device (e.g., an Internet-of-Things (IoT) device) or from another entity, provides a digital certificate of a network-connected device for authentication. In response to receiving the digital certificate, the network-connected device evaluates the digital certificate to identify a set of parameters of the digital certificate. These parameters may include the size of the digital certificate serial number, the number of fields in the digital certificate's subject name, the name of the fields in the digital certificate's subject name, the validity duration of the digital certificate, the cryptographic key algorithm used for generating the digital signature of the digital certificate, the cryptographic key algorithm used for the public cryptographic key of the digital certificate, the size of the public cryptographic key, the size of the common name of the digital certificate, the type of characters included in the common name of the digital certificate, the number of extension records in the digital certificate, the names of the extension records, and the names/values of fields in the extension records. These parameters may create unique characteristics for issued digital certificates which may be shared at least across a group of digital certificates provisioned for the same network-connected device fleet.

In an example, the network-connected device service maintains clusters of characteristic profiles for issued digital certificates of network-connected devices. These clusters may be created for each customer of the network-connected device service and at multiple levels of organization, account, data region, certificate authority, and network-connected device group or type. The digital certificate clusters may be generated during an initial period, wherein the network-connected device service may classify received digital certificates into digital certificate clusters based on the commonality of features of the received digital certificates. In an example, if the network-connected device identifies a digital certificate cluster that corresponds to the set of parameters of the received digital certificate, the network-connected device service adds the received digital certificate to this identified digital certificate cluster. However, if the network-connected device is unable to identify a digital certificate cluster that corresponds to the set of parameters of the received digital certificate, the network-connected device service may generate a new digital certificate cluster and add the digital certificate to this new digital certificate cluster. In an example, there can be an acceptable threshold for including a digital certificate in a digital certificate cluster without an exact match of parameters. For example, a digital certificate that matches all parameters of a digital certificate cluster except for a serial number that is longer than that of the other digital certificates of the cluster may still be mapped to the digital certificate cluster.

In an example, the network-connected device service evaluates the various digital certificate clusters for a particular customer account or other organizational unit to identify any small digital certificate clusters (e.g., have a low number of digital certificates relative to other clusters). These small digital certificate clusters may include digital certificates that are different from more commonly received digital certificates and, thus, may be indicative of a potential breach of a certificate authority that purportedly issued the digital certificates identified in the small digital certificate clusters. The network-connected device service may transmit the digital certificates included in the small digital certificate clusters to a network monitoring service, which may transmit a notification to the customer to indicate that the certificate authority that issued these digital certificates has been compromised. This enables the customer to perform any remedial actions to address the breach of the certificate authority.

In an example, the network-connected device service performs mitigating actions to reduce the number of false positives in detecting anomalous digital certificates through clustering of received digital certificates. For instance, the network-connected device service may consider the number of digital certificate clusters and their size to establish a confidence level for identifying digital certificate clusters that may include anomalous digital certificates. For instance, if an account has a significant number of digital certificate clusters with each digital certificate cluster having a small number of digital certificates over a period of time, the network-connected device service may determine that transmitting a notification to the network monitoring service to indicate presence of anomalous digital certificates is not required. However, if an account has had a small number of digital certificate clusters with each digital certificate cluster including a significant number digital certificates over a period of time and a new digital certificate is received that does not map to any of these digital certificate clusters, the network-connected device service may determine that this new digital certificate may be anomalous. This may cause the network-connected device service to transmit the new digital certificate to the network monitoring service to perform any necessary remedial actions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because the network-connected device service maintains digital certificate clusters corresponding to parameters of digital certificates obtained for a customer account or other organizational unit, the network-connected device service may classify any newly obtained digital certificates into any existing digital certificate cluster or into a new digital certificate cluster if any of the digital certificates do not correspond to any of the existing digital certificate clusters. This enables rapid identification of potentially anomalous digital certificates and a breach of a certificate authority. Further, because the network-connected device service may utilize the distribution of digital certificates among various digital certificate clusters to identify digital certificate patterns for an account or other organizational unit, the network-connected device service may reduce the risk of false positives when a new digital certificate is obtained.

FIG. 1 shows an illustrative example of a system 100 in which various embodiments can be implemented. In the system 100, a network-connected device service 102 receives a digital certificate 108 from a network-connected device 106 and an anomalous digital certificate 110 from an unauthorized user 104 purporting to be a network-connected device. The network-connected device 106 may be an electronic device that includes a mechanism for communication (e.g., WiFi®, Bluetooth®, Near Field Communication (NFC), etc.), a mechanism for determining its physical location, and a mechanism for processing and executing commands received from a user or controlling device. In some embodiments, the network-connected device 106 is a headless device that has no external display screen, buttons, or other types of controls for external control of the network-connected device 106. The network-connected device 106 may provide state information to the network-connected device service 102 over time. For instance, the network-connected device 106 may transmit, using HyperText Transfer Protocol (HTTP), Message Queuing Telemetry Transport (MQTT), or other communications protocols, state information for the network-connected device 106 to the network-connected device service 102. The network-connected device service 102 may store this state information in or more device records.

In an embodiment, the network-connected device 106 transmits a request to the network-connected device service 102 to access one or more computing resource services 116 to provide, through the network-connected device 106, access to one or more computing resources provided by the computing resource services 116. For instance, the network-connected device 106 may utilize computing resources provided by the computing resource services 116 to enable functionality of one or more features of the network-connected device 106. The request to the network-connected device service 102 may include a digital certificate 108, which the network-connected device service 102 may utilize to authenticate the network-connected device 106. The network-connected device service 102 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. For instance, the network-connected device service 102 may comprise one or more computer systems, such as device servers, that enable network-connected devices to securely interact with computing resources provided by one or more computing resource services 116 and other network-connected devices that access the network-connected device service 102.

In an embodiment, the digital certificate 108 is an X.509 certificate, although other digital certificate encodings are also considered as being within the scope of the present disclosure. The digital certificate 108 may include various fields such as a version field, a serial number field, an algorithm identifier field, an issuer field, fields for validity periods, a subject field, fields about the public cryptographic key, issuer unique identifier fields, subject unique identifier fields, extension fields, certificate signature algorithm fields, and a certificate signature field. X.509 certificates are described in RFC 4158, RFC 5280, and RFC 1422, which are incorporated by reference. In some embodiments, the value of a particular field within the digital certificate 108 includes a Uniform Resource Identifier (URI) or other network address corresponding to a location where information usable for authentication can be obtained. For example, the value within the certificate signature field may include a URI corresponding to a server that maintains the digital certificate signature. This may cause the network-connected device service to utilize the URI to obtain the digital certificate signature from the server associated with the URI.

The network-connected device 106 may obtain the digital certificate 108 from a certificate authority as fulfillment of a digital signature signing request generated by the network-connected device 106 and provided to the certificate authority. The digital certificate signing request may include encrypted verification data and a public cryptographic key generated by the network-connected device 106 as part of a cryptographic key pair generation process and that is to be used in the creation of the digital certificate 108. The certificate authority may identify a validity period for the digital certificate 108 and specify this validity period using one or more fields of the digital certificate 108. If the certificate authority successfully authenticates the network-connected device 106, the certificate authority may digitally sign the digital certificate 108 and provide the digital certificate 108 to the network-connected device 106 to fulfill the digital certificate signing request.

In some instances, the certificate authority may be compromised by an unauthorized user 104, which may utilize the certificate authority to generate anomalous digital certificates 110. The anomalous digital certificates 110 may be similar in structure to the digital certificate 108 (e.g., the anomalous digital certificates 110 may be X.509 certificates, include the same fields as the digital certificate 108, etc.). The unauthorized user 104 may generate the anomalous digital certificates 110 to impersonate the network-connected device 106 to gain access to the computing resources of the computing resource services 116 and/or to access account information of a customer associated with the network-connected device 106. The anomalous digital certificates 108 may include one or more parameters that do not match the commonly used parameters of the digital certificate 108 used by authorized certificate authority operators in generating the digital certificate 108 and other digital certificates in response to authenticated requests from the network-connected device 106 and/or customers of the network-connected device service 102 that maintain the network-connected device 106.

The digital certificate 108 and the anomalous digital certificates 110 may each include various parameters that may create a characteristic profile for each of the digital certificates. For example, the parameters may include the size of the digital certificate serial number, the number of fields in the digital certificate's subject name, the name of the fields in the digital certificate's subject name, the validity duration of the digital certificate, the cryptographic key algorithm used for generating the digital signature of the digital certificate, the cryptographic key algorithm used for the public cryptographic key of the digital certificate, the size of the public cryptographic key, the size of the common name of the digital certificate, the type of characters included in the common name of the digital certificate, the number of extension records in the digital certificate, the names of the extension records, and the names/values of fields in the extension records. These parameters may differ between the digital certificate 108 and the anomalous digital certificates 110, as the unauthorized user 104 may be unaware of unique characteristics for issued digital certificates that are often shared at least among a group of digital certificates provisioned for a network-connected device fleet that includes the network-connected device 106.

In an embodiment, the network-connected device service 102 obtains the digital certificate 108 and the anomalous digital certificate 110 in response to requests to access computing resources provided by the computing resource services 116. As noted above, the anomalous digital certificate 110 may be provided by an unauthorized user 104 of the certificate authority used to issue the anomalous digital certificate 110. The anomalous digital certificate 110 may be generated by the unauthorized user 104 to mimic an authentic digital certificate issued to a network-connected device 106 for authentication of the network-connected device 106. Thus, the intent in generating the anomalous digital certificate 110 may be to impersonate the network-connected device 106 in order to gain access to the computing resource services 116 and any sensitive information associated with the network-connected device 106. The digital certificate 108 may be provided by the network-connected device 106 and may have been issued by the certificate authority prior to the breach by the unauthorized user 104 and/or by an authorized user of the certificate authority. The digital certificate 108 and the anomalous digital certificate 110 may be obtained at different times or within a short time period.

In an embodiment, the network-connected device service 102 evaluates the digital certificate 108 to identify the different parameters of the digital certificate 108. Based on the different parameters of the digital certificate 108, the network-connected device service 102 identifies a digital certificate cluster corresponding to the set of parameters of the digital certificate 108. In an embodiment, the network-connected device service 102 generates a set of digital certificate clusters for each customer of the network-connected device service 102 and at multiple levels of organization, account, region, certificate authority, network-connected device group, network-connected device type, and the like. A baseline for the digital certificate clusters may be established over an initial period of time during which usage data is obtained for different digital certificates obtained by the network-connected device service 102 from various network-connected devices, including the network-connected device 106. Alternatively, the baseline for the digital certificate clusters may be obtained based on prior usage data gathered for use of digital certificates associated with a particular customer account of the network-connected device service 102.

In an embodiment, each digital certificate cluster is specific to a particular combination of parameters of a digital certificate observed by the network-connected device service 102. Thus, the network-connected device service 102 may evaluate the digital certificate 108 to identify the parameters of the digital certificate 108 and determine whether any digital certificate cluster corresponds to the parameters of the digital certificate 108. If the network-connected device service 102 identifies a digital certificate cluster corresponding to the parameters of the digital certificate 108, the network-connected device service 102 may classify the digital certificate 108 as being part of the digital certificate cluster. For instance, the digital certificate cluster may serve as a counter corresponding to the number of digital certificates comprising the set of parameters of the digital certificate cluster encountered by the network-connected device service 102 over time. However, if the network-connected device service 102 is unable to identify an existing digital certificate cluster corresponding to the parameters of the digital certificate 108, the network-connected device service 102 may create a new digital certificate cluster corresponding to the parameters of the digital certificate 108.

While digital certificate clusters may be generated and maintained based on matching of parameters of digital certificates processed by the network-connected device service 102, other clustering techniques may be used to generate the digital certificate clusters. For example, the network-connected device service 102 may utilize K-Means clustering to generate the digital certificate clusters and to classify a digital certificate as being part of a digital certificate cluster. The network-connected device service 102 may select a number of digital certificate clusters corresponding to different sets of parameters for digital certificates received by the network-connected device service 102. In response to receiving a digital certificate 108 from a network-connected device 106, the network-connected device service 102 may classify the digital certificate 108 by computing, through use of a parameter distance function (e.g., Euclidean Distance, Euclidean Squared Distance, Manhattan Distance, Chebychev Distance, Minkowski Distance, etc.), the distance between the parameters of the digital certificate 108 and the center of each digital certificate cluster such that the digital certificate 108 is classified as being part of the digital certificate cluster that is closest to the digital certificate 108. The degree of similarity between different parameters usable as input to the parameter distance function may be determined based on criteria set forth by the network-connected device service 102 and/or a customer. For instance, a customer may identify a weight for each parameter of the digital certificate such that differences for a certain parameters may have greater weight (e.g., greater distance) than differences for other parameters. In an embodiment, the parameter distance function accepts, as inputs, some or all field values of two points in space, where the coordinates of the points correspond to the parameters of the digital certificate and of the clusters. For example, the parameter distance function may calculate the distance between a digital certificate and a digital certificate cluster by using, as input, the field vales of the digital certificate and of the digital certificate cluster into the function. In one embodiment, the function is defined based on a series of sub-metrics.

As more digital certificates are processed and classified by the network-connected device service 102, the network-connected device service 102 may recalculate the center for each digital certificate cluster by taking the mean of all the vectors of each digital certificate cluster. Over time, the center for each digital certificate cluster may converge to a particular point such that there is minimal movement between iterations. Other techniques usable to generate and maintain the various digital certificate clusters include K-Medians clustering, mean-shift clustering, density-based spatial clustering of applications with noise (DBSCAN), expectation-maximization (EM) clustering using Gaussian mixture models (GMM), agglomerative hierarchical clustering, and the like. Thus, the network-connected device service 102 may utilize an alternative clustering algorithm for classifying a digital certificate 108 as being part of a particular digital certificate cluster even if one or more parameters of the digital certificate 108 do not exactly match the set of parameters of the digital certificate cluster.

As noted above, the parameters of digital certificates issued by a certificate authority for use by a network-connected device fleet may have a set of unique characteristics. Thus, the incidence of digital certificates having this set of unique characteristics may be higher than the incidence of other digital certificates that may be generated by an unauthorized user 104 through breach of the certificate authority. For instance, the unauthorized user 104 may not have access to particular parameters selected for use in digital certificates issued by the certificate authority to the network-connected device 106 and other network-connected devices of a network-connected device fleet. Thus, the anomalous digital certificate 110 may have one or more different parameters that may distinguish the anomalous digital certificate 110 from the digital certificate 108 and other digital certificates issued to the network-connected device 106 and other network-connected devices of the fleet.

In an embodiment, since the digital certificate 108 and other digital certificates of the network-connected device fleet may share a similar set of parameters, the network-connected device service 102 classifies the digital certificate 108 as being part of a common certificate cluster 112 for the account associated with the network-connected device 106. The common certificate cluster 112 may correspond to a set of parameters in common with the digital certificate 108 and other digital certificates of the network-connected device fleet associated with the account. The parameters of the digital certificate 108 may match those of the common certificate cluster 112 or may be similar to those of the common certificate cluster 112 as determined through use of any of the clustering algorithms described above. Alternatively, the anomalous digital certificate 110 may be comprise a set of parameters that are dissimilar to those of the common certificate cluster 112, as one or more parameters of the anomalous digital certificate 110 may be selected by the unauthorized user 104 without knowledge of the set of parameters used for the digital certificate 108 and other digital certificates issued by the certificate authority to the network-connected devices of a network-connected device fleet. Thus, the network-connected device service 102 may classify the anomalous digital certificate 110 as being part of an uncommon certificate cluster 114, which may have a lower incidence rate than the common certificate cluster 112.

In an embodiment, the network-connected device service 102 performs an audit of the various digital certificate clusters corresponding to an account associated with the network-connected device 106 to identify any digital certificate clusters corresponding to digital certificate outliers (e.g., digital certificates whose incidence falls below a threshold rate, etc.). For instance, based on a number of digital certificates received by the network-connected device service 102 and classified into any of the digital certificate clusters for the account, the network-connected device service 102 may determine an incidence rate for each digital certificate cluster. As noted above, each digital certificate cluster may serve as a counter corresponding to the number of digital certificates processed by the network-connected device service 102 having parameters corresponding to the parameters of the digital certificate cluster. Thus, for more commonly encountered digital certificates, the common certificate cluster 112 may have a greater incidence rate than the uncommon certificate cluster 114.

Based on the audit of the various digital certificate clusters, the network-connected device service 102 may identify the uncommon certificate cluster 114 as being indicative of outlier digital certificates that may have originated through a breach of the certificate authority or otherwise generated by an unauthorized user 104. The network-connected device service 102 may transmit a notification to a network monitoring service 118 to indicate that the anomalous digital certificate 110 is suspected as being from an unauthorized user 104 or otherwise originated from a compromised certificate authority. The network monitoring service 118 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The network monitoring service 118 may evaluate the anomalous digital certificate 110 to identify a possible source of the breach of the certificate authority used to issue the anomalous digital certificate 110. Further, the network monitoring service 118 may transmit a notification to a customer or other administrator of the account to indicate that the certificate authority utilized to issue digital certificates for the network-connected device 106 and other network-connected devices of a fleet may be compromised. This enables the customer to perform remedial actions to address the breach (e.g., selecting an alternative certificate authority for issuance of digital certificates, etc.). In an embodiment, the network-connected device service 102 can blacklist any digital certificates having the parameters of the anomalous digital certificate 110 or that otherwise correspond to the uncommon certificate cluster 114. For instance, the network-connected device service 102 may maintain a certificate revocation list (CRL), which specifies identifiers for digital certificates that have been revoked or are otherwise invalid for use in authenticating network-connected devices.

In an embodiment, the network monitoring service 118 monitors access to the computing resource services 116 by the unauthorized user 104 or other entity that submitted the anomalous digital certificate 110 for authentication to garner additional information regarding the unauthorized access to the computing resource services 116. For instance, the network monitoring service 118 may generate one or more honeypot resources that may be presented to the unauthorized user 104 rather than the requested resources provided by the computing resource services 116. A honeypot resource, in the context of computer network security, can include software and hardware resources that are intended to detect, deflect, or counteract attempts at unauthorized use of information systems. In some examples, honeypot resources can include simulated network resources such as simulated virtual machines, simulated storage, and the like, but in other examples, real network resources can be a part of a honeypot resource. Some honeypot resources are designed to trick malicious users into believing that they are using or have access to legitimate resources or important data, when in reality the resources are simulated or the data that the unauthorized user 104 has access to is not real. Additionally, honeypot resources can act as a decoy for malicious users. Accordingly, with unauthorized users 104 believing that they have been undetected and have access to resources and information of interest, the actions of these unauthorized users 104 can be tracked by the network monitoring service 118 and neutralized. For example, by allowing unauthorized users 104 to act within honeypot resources, this can allow the network monitoring service 118 and network administrators to learn about potential security risks of a network and gain information about unauthorized users 104 that can be provided to law enforcement or can otherwise be used to stop these unauthorized users 104.

The network-connected device service 102 may process incoming digital certificates, including the digital certificate 108, that are classified as being part of the common certificate cluster 112. For instance, the network-connected device service 102 may utilize the digital certificate 108 to authenticate the network-connected device 106. Further, the network-connected device service 102 may enable the network-connected device 106 to access the computing resource services 116 and any computing resources necessary for functionality of the network-connected device 106, subject to any applicable access policies defined by an administrator of the computing resources and/or by the computing resource services 116.

In an embodiment, the network-connected device service 102 evaluates the different digital certificate clusters of a customer account or other organizational level to prevent false positives for identification of anomalous digital certificates and clusters. For example, the network-connected device service 102 may consider the number of digital certificate clusters and their relative sizes to establish a confidence level for detecting anomalous digital certificates. As an illustrative example, if a particular customer account is associated with one hundred digital certificate clusters, whereby each cluster has between one and five digital certificates and the number of digital certificate clusters has not stabilized over a period of time, the network-connected device service 102 may assign a low level of confidence for identifying anomalous digital certificates. In contrast, if a particular customer account is associated with a small number (e.g., five or less) digital certificate clusters, whereby each digital certificate cluster has more than five hundred digital certificates over a period of time, an observation of an anomalous digital certificate 110 that does not correspond to any of the digital certificate clusters may serve as an indication that the anomalous digital certificate 110 originated from an unauthorized user 104 or otherwise compromised certificate authority. This may cause the network-connected device service 102 to transmit a notification to the network monitoring service 118 to indicate that an anomalous digital certificate 110 has been identified.

A customer of the network-connected device service 102 may also provide input as to which parameters are to be excluded or otherwise given lesser consideration for clustering of incoming digital certificates. For instance, a customer may specify that clustering of the digital certificates be performed based on a lesser number of parameters of the digital certificates than the full panoply of parameters of the digital certificates. This may remove false positive identification of digital certificates as being anomalous if these digital certificates do not match all parameters of previously received digital certificates that were utilized to generate the set of digital certificate clusters.

Figure 2:
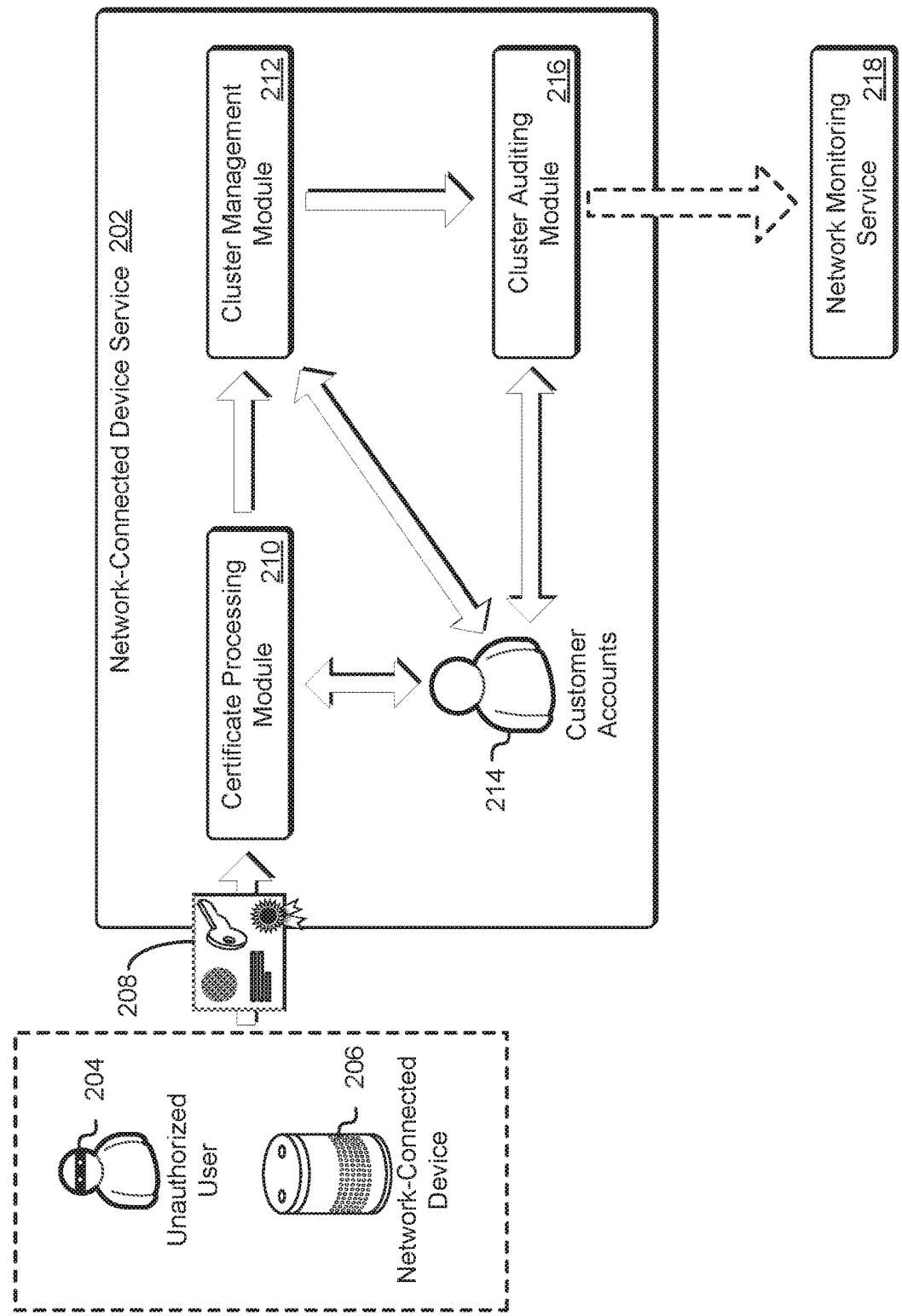
FIG. 2 shows an illustrative example of a system in which a network-connected device service evaluates digital certificates purportedly from a network-connected device to determine whether a certificate authority that issues digital certificates has been compromised in accordance with at least one embodiment.

FIG. 2 shows an illustrative example of a system 200 in which a network-connected device service 202 evaluates digital certificates 208 purportedly from a network-connected device 206 to determine whether a certificate authority that issues digital certificates has been compromised in accordance with at least one embodiment. In the system 200, a certificate processing module 210 obtains (e.g., receives over a communications network or over another communications channel) a digital certificate 208 purportedly from a network-connected device 206. As noted above, a network-connected device 206 may obtain the digital certificate 208 from a certificate authority as fulfillment of a digital signature signing request generated by the network-connected device 206 and provided to the certificate authority. The certificate authority may identify a validity period for the digital certificate 208 and specify this validity period using one or more fields of the digital certificate 208. If the certificate authority successfully authenticates the network-connected device 206, the certificate authority may digitally sign the digital certificate 208 and provide the digital certificate 208 to the network-connected device 206 to fulfill the digital certificate signing request. However, if the certificate authority is compromised by an unauthorized user 204 or other malicious entity, the unauthorized user 204 or other malicious entity may generate a digital certificate that may include one or more similar parameters as authentic digital certificates issued by the certificate authority to the network-connected device 206 and other trusted entities for authentication. However, the digital certificates generated by the unauthorized user 204 or other malicious entity may include parameters that do not match the commonly used parameters utilized in digital certificates issued by the certificate authority to the network-connected device 206 and other authenticated entities.

The certificate processing module 210 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The certificate processing module 210 may evaluate the digital certificate 208 provided by the network-connected device 206 or from the unauthorized user 204 to identify a set of parameters of the digital certificate 208. For instance, the certificate processing module 210 may extract, from the digital certificate 208, the size of the digital certificate serial number, the number of fields in the digital certificate's subject name, the name of the fields in the digital certificate's subject name, the validity duration of the digital certificate, the cryptographic key algorithm used for generating the digital signature of the digital certificate, the cryptographic key algorithm used for the public cryptographic key of the digital certificate, the size of the public cryptographic key, the size of the common name of the digital certificate, the type of characters included in the common name of the digital certificate, the number of extension records in the digital certificate, the names of the extension records, and the names/values of fields in the extension records. The certificate processing module 210 may utilize these parameters to generate a characteristic profile of the digital certificate 208.

In an embodiment, the certificate processing module 210 accesses an account 214 of a customer to obtain information usable to authenticate the digital certificate 208. For instance, the certificate processing module 210 may evaluate the digital certificate 208 to determine if the digital certificate 208 specifies, as its subject, an identifier for the customer or the network-connected device 206. If the digital certificate 208 does not specify an identifier for the customer or the network-connected device 206, the certificate processing module 210 may determine that the digital certificate does not correspond to a trusted source and, as a result, may reject the digital certificate 208. The certificate processing module 210 may also evaluate the digital certificate 208 to determine if the digital certificate 208 itself is valid and that the issuer of the certificate is a trusted certificate authority (e.g., is a trusted certificate authority, or has a digital certificate that chains in a certificate chain to a trusted certificate authority). For example, the certificate processing module 210 may evaluate the digital certificate 208 to determine whether it has expired. The digital certificate 208 may include a field that specifies an expiration date for the digital certificate 208. If the digital certificate 208 has expired, the certificate processing module 210 may determine that the digital certificate 208 is not valid for use. Similarly, the digital certificate 208 may include a field that specifies a "not before" date. If the digital certificate 208 specifies a "not before" date that is after the date at which the certificate processing module 210 has received the digital certificate 208, the certificate processing module 210 may determine that the digital certificate 208 cannot be used for authentication, as the digital certificate 208 has not become active for use.

If the certificate processing module 210 determines that the digital certificate 208 is valid for use based on information specified in the digital certificate 208 and from the customer account 214, the certificate processing module 210 may provide the characteristic profile of the digital certificate 208 to a cluster management module 212 for classifying the digital certificate 208 into a digital certificate cluster. The cluster management module 212 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The cluster management module 212 may access the account 214 of the customer associated with the network-connected device 206 to identify a set of digital certificate clusters associated with the customer account 214. As noted above, the network-connected device service 202 may generate a set of digital certificate clusters for each customer of the network-connected device service 202 and at multiple levels of organization, account, region, certificate authority, network-connected device group, network-connected device type, and the like. A baseline for the digital certificate clusters may be established over an initial period of time during which usage data is obtained for different digital certificates obtained by the network-connected device service 202 from various network-connected devices, including the network-connected device 206. Alternatively, the baseline for the digital certificate clusters may be obtained based on prior usage data gathered for use of digital certificates associated with a particular customer account 214 of the network-connected device service 202. In an embodiment, the cluster management module 212 accesses a customer account 214 to identify any preferences for digital certificate parameters that are to be excluded from consideration or whose importance may be diminished in classifying digital certificates to any of the digital certificate clusters.

Each digital certificate cluster may be specific to a particular combination of parameters of a digital certificate observed by the cluster management module 212. The cluster management module 212 may evaluate the characteristic profile of the digital certificate 208 to determine whether any digital certificate cluster corresponds to the parameters of the digital certificate 208. If the cluster management module 212 identifies a digital certificate cluster corresponding to the parameters of the digital certificate 208, the cluster management module 212 may classify the digital certificate 208 as being part of the digital certificate cluster. In some instances, if the cluster management module 212 utilizes one or more clustering algorithms to generate and maintain the various digital certificate clusters, the cluster management module 212 may utilize these one or more clustering algorithms to identify a digital certificate cluster for the digital certificate 208 even if the parameters of the digital certificate 208 do not exactly match those of a particular digital certificate cluster. In an embodiment, if the digital certificate 208 does not correspond to any of the existing digital certificate clusters identified by the cluster management module 212, the cluster management module 212 may generate a new digital certificate cluster corresponding to the characteristic profile of the digital certificate 208. This enables classification of the digital certificate 208 with the newly generated digital certificate cluster. The cluster management module 212 may update the customer account 214 to indicate the current state of the digital certificate clusters. This may include a count corresponding to the number of digital certificates classified as being part of each digital certificate cluster associated with the customer account 214.

In an embodiment, the cluster management module 212 transmits a notification to a cluster auditing module 216 to initiate an analysis of the digital certificate clusters associated with the customer account 214 to identify any anomalous digital certificates that may have been obtained by the network-connected device service 202. The cluster auditing module 216 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The cluster auditing module 216 may evaluate the digital certificate clusters of the customer account 214 to determine whether there are any digital certificate clusters corresponding to infrequently processed digital certificates obtained by the network-connected device service 202. As noted above, each digital certificate cluster may represent a count for digital certificates having certain parameters encountered by the network-connected device service 202. The cluster auditing module 216 may evaluate the digital certificate clusters to determine whether there are one or more digital certificate clusters having a low number of digital certificate incidences compared to other digital certificate clusters of the customer account 214.

In an embodiment, the cluster auditing module 216 performs one or more mitigating actions to prevent a false positive result indicating detection of anomalous digital certificates. For instance, the cluster auditing module 216 may consider the number of digital certificate clusters and their relative sizes to establish a confidence level for detecting anomalous digital certificates. For example, if a particular customer account 214 is associated with a significant number of digital certificate clusters, whereby each cluster has a small number of digital certificates and the number of digital certificate clusters has not stabilized over a period of time, the cluster auditing module 216 may assign a low level of confidence for identifying anomalous digital certificates. In contrast, if a particular customer account 214 is associated with a small number of digital certificate clusters, whereby each digital certificate cluster has a significant number of digital certificates over a period of time, an observation of an anomalous digital certificate that does not correspond to any of the digital certificate clusters may serve as an indication that the anomalous digital certificate originated from an unauthorized user 204 or otherwise compromised certificate authority. Additionally, or alternatively, the customer account 214 may specify one or more preferences for identifying anomalous digital certificates. For example, a customer may specify, through the customer account 214, a threshold count for identifying digital certificate clusters associated with anomalous digital certificates. For instance, if the cluster auditing module 216 identifies a digital certificate cluster having a digital certificate count greater than the threshold count, the cluster auditing module 216 may ignore this digital certificate cluster from its determination of anomalous digital certificates.

The customer, via the customer account 214, may also specify digital certificate clusters and/or parameters that are to be excluded from the analysis performed by the cluster auditing module 216. For instance, a customer may want to bring new network-connected devices online, which may require creation of new digital certificates that may have several different parameters from existing digital certificates for the fleet of network-connected devices. To prevent a false positive result, the customer may update the customer account 214 to provide the parameters of these new digital certificates to cause the cluster auditing module 216 to ignore digital certificate clusters associated with these new digital certificates.

If the cluster auditing module 216 identifies one or more digital certificate clusters that are indicative of anomalous digital certificates that may have been generated by an unauthorized user 204 or otherwise by a compromised certificate authority, the cluster auditing module 216 may transmit a notification to a network monitoring service 218 to indicate the presence of anomalous digital certificates. The cluster auditing module 216 may provide an identifier corresponding to each anomalous digital certificate detected via evaluation of the digital certificate clusters. Alternatively, the cluster auditing module 216 may provide a characteristic profile specifying common parameters of the anomalous digital certificates identified by the cluster auditing module 216. The network monitoring service 218 may evaluate the identified anomalous digital certificates and/or characteristic profile to identify a source of the anomalous digital certificates. For instance, the parameters utilized in the anomalous digital certificates may be similar to other digital certificates previously generated by the unauthorized user 204 or other malicious entity and detected through evaluation of digital certificates associated with other customer accounts. Additionally, or alternatively, the network monitoring service 218 may receive breach alerts from a certificate authority or other third party, which the network monitoring service 218 to determine whether the anomalous digital certificates are associated with the received alerts. The network monitoring service 218 may transmit a notification to the customer associated with the customer account 214 to indicate that the network monitoring service 218 has detected anomalous digital certificates purporting to be from the network-connected device 206. This enables the customer to perform one or more remedial actions to address the issue (e.g., selecting an alternative certificate authority for generating digital certificates, rotation of cryptographic keys, etc.). The network monitoring service 218 may additionally, or alternatively, add the anomalous digital certificates to a blacklist accessible by the certificate processing module 210. Thus, if the certificate processing module 210 receives an authentication request that includes a blacklisted digital certificate, the certificate processing module 210 may automatically reject the request.

Figure 3:
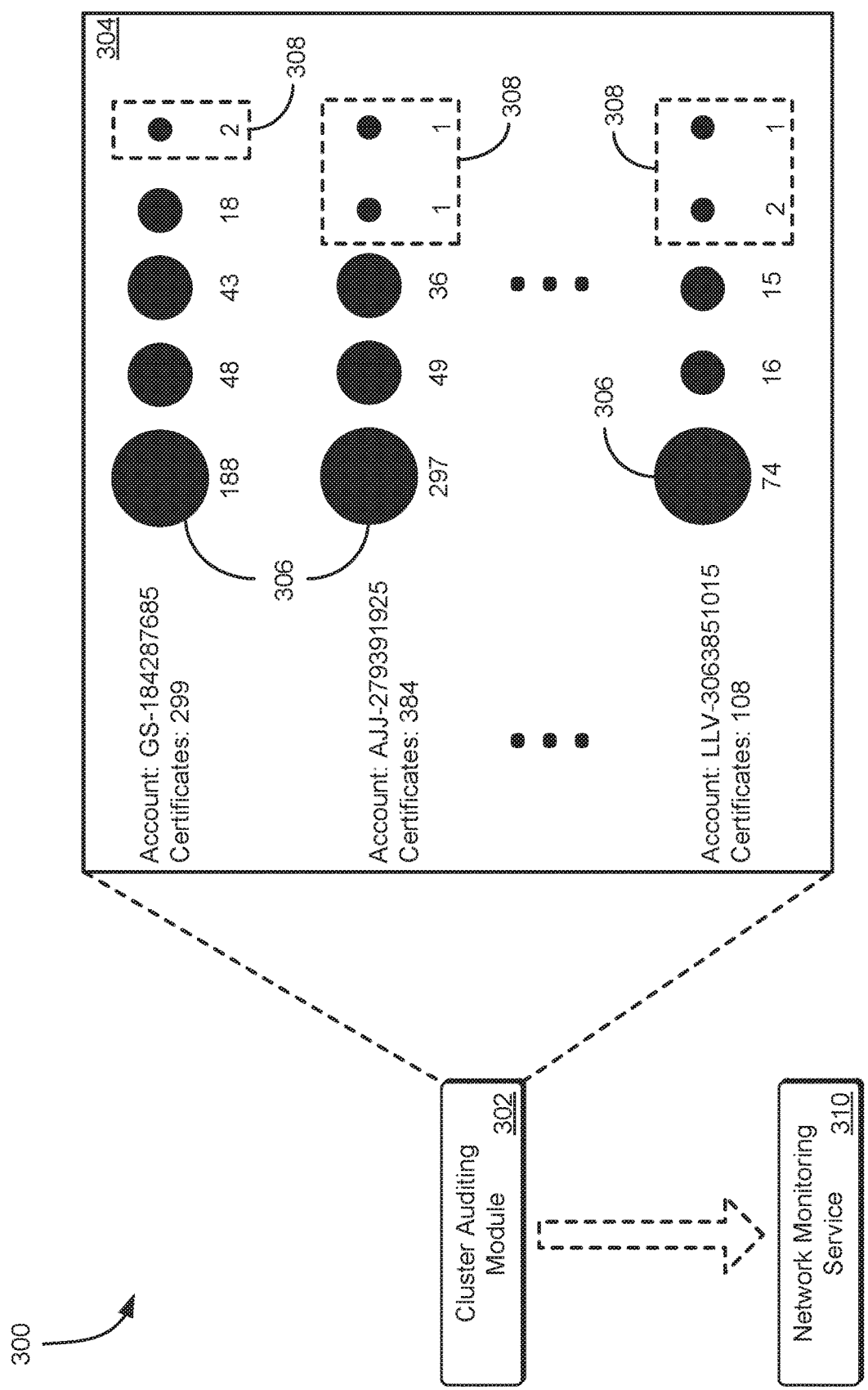
FIG. 3 shows an illustrative example of a system in which a cluster auditing module evaluates digital certificate clusters for each account to identify potentially compromised digital certificates in accordance with at least one embodiment.

FIG. 3 shows an illustrative example of a system 300 in which a cluster auditing module 302 evaluates digital certificate clusters for each account to identify potentially compromised digital certificates in accordance with at least one embodiment. In the system 300, the cluster auditing module 302 generates an interface 304 usable to graphically represent the various digital certificate clusters for each account of the network-connected device service. The interface 304 may be a graphical user interface (GUI) that may be used to represent graphical representations of digital certificate clusters based on their relative size. For example, as illustrated in FIG. 3, the cluster auditing module 302 generates an interface 304 that represents digital certificate clusters 306 in accordance to their proportional size (e.g., larger digital certificate clusters are represented using a larger image or other graphical representation, whereas smaller digital certificate clusters are represented using smaller images or graphical representations). The size of each digital certificate cluster 306 may depend on the percentage of digital certificates encountered for the account over a period of time.

The graphical representation of the digital certificate clusters 306 may be organized within the interface 304 in accordance to the account associated with these digital certificate clusters 306. Alternatively, the graphical representation of the digital certificate clusters 306 may be organized based on different organizational units. For instance, the digital certificate clusters 306 may graphically represented in the interface 304 based on the corresponding certificate authority that issued the digital certificates, the organization to which the digital certificates were issues, the network-connected device to which the digital certificates were issued, and the like. Thus, while the interface 304 illustrated in FIG. 3 demonstrates organization of digital certificate clusters 306 at an account level, the interface 304 may be updated to present organization of digital certificate clusters 306 in accordance with other organizational units.

As noted above, the cluster auditing module 302 may identify one or more digital certificate clusters that are indicative of anomalous digital certificates that may have been generated by an unauthorized user or otherwise by a compromised certificate authority. In an embodiment, if the cluster auditing module 302 identifies one or more digital certificate clusters that are indicative of anomalous digital certificates, the cluster auditing module 302 updates the interface 304 to highlight these digital certificate clusters. For example, the cluster auditing module 302 may update the interface 304 to add an anomalous digital certificate indicator 308 surrounding the digital certificate clusters that represent anomalous digital certificates identified by the cluster auditing module 302. This may enable a user of the interface 304 to visually identify the digital certificate clusters corresponding to anomalous digital certificates and/or parameters of anomalous digital certificates identified by the cluster auditing module 302.

If the cluster auditing module 302 identifies one or more digital certificate clusters that are indicative of anomalous digital certificates that may have been generated by an unauthorized user, the cluster auditing module 302 may transmit a notification to a network monitoring service 310 to indicate the presence of anomalous digital certificates. In an embodiment, the cluster auditing module 302 may make the interface 304 available to the network monitoring service 310 to enable an administrator or other user of the network monitoring service 310 to evaluate the interface 304 and identify the anomalous digital certificate clusters for each account or other organizational unit. The network monitoring service 310 may evaluate the identified anomalous digital certificates and/or characteristic profile to identify a source of the anomalous digital certificates. The network monitoring service 310 may transmit a notification to the customer associated with the customer accounts associated with any identified anomalous digital certificate clusters to indicate that the network monitoring service 310 has detected anomalous digital certificates purporting to be from a network-connected device.

Figure 4:
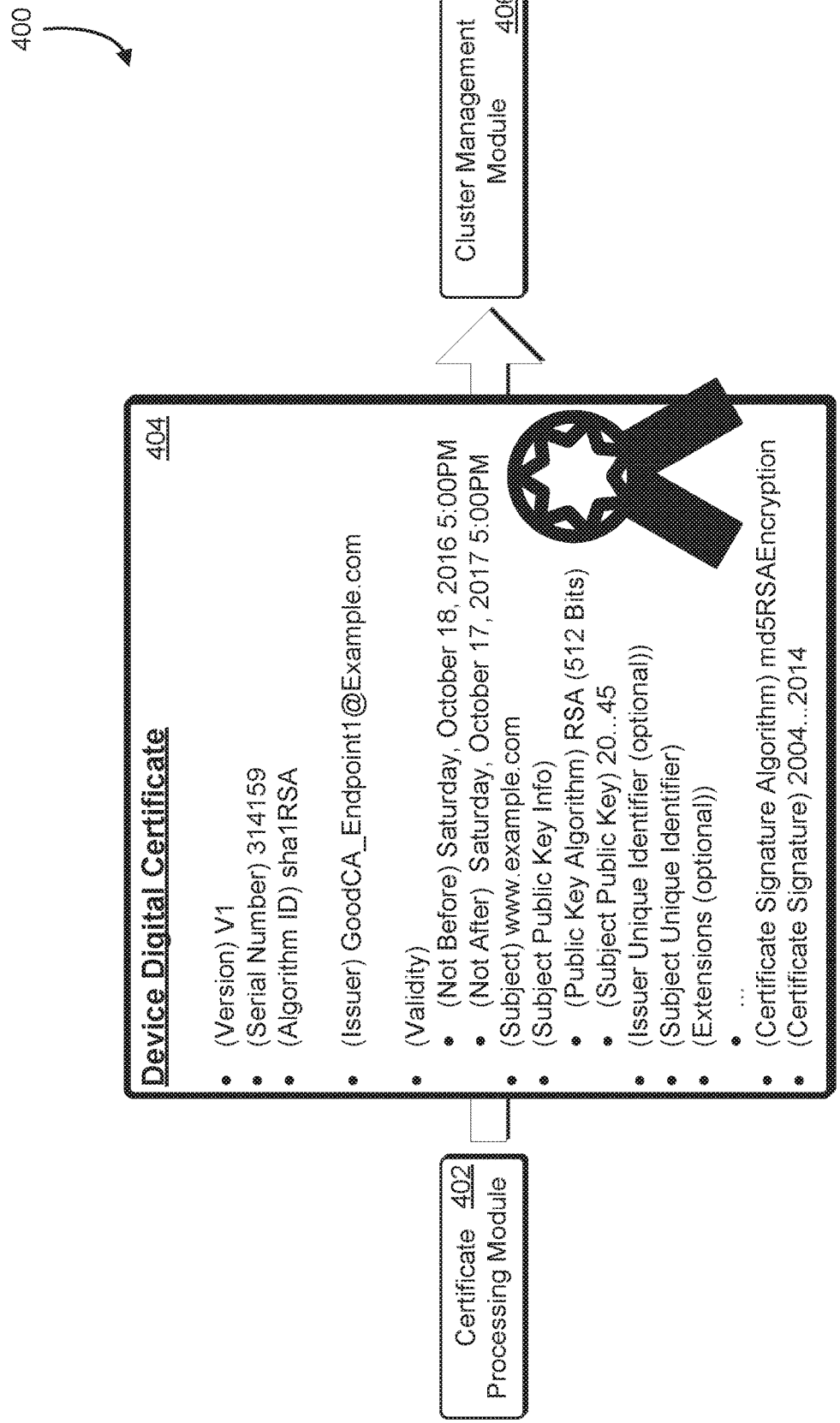
FIG. 4 shows an illustrative example of a system in which a certificate processing module evaluates a digital certificate to identify a set of parameters usable by a cluster management module to identify a cluster for the digital certificate in accordance with at least one embodiment.

FIG. 4 shows an illustrative example of a system 400 in which a certificate processing module 402 evaluates a digital certificate 404 to identify a set of parameters usable by a cluster management module 406 to identify a cluster for the digital certificate 404 in accordance with at least one embodiment. In the system 400, a certificate processing module 402 evaluates a received digital certificate 404 to identify a set of parameters usable to generate a characteristic profile of the digital certificate 404. In an embodiment, the digital certificate 404 is an X.509 certificate, although other digital certificate encodings are also considered as being within the scope of the present disclosure. In this particular example, the digital certificate 404 includes various fields such as a version field, a serial number field, an algorithm identifier field, an issuer field, fields for validity periods, a subject field, fields about the public cryptographic key, issuer unique identifier fields, subject unique identifier fields, extension fields, certificate signature algorithm fields, and a certificate signature field.

A customer may obtain, for a network-connected device, the digital certificate 404 from a certificate authority as fulfillment of a digital signature signing request generated by the customer and provided to the certificate authority. The digital certificate signing request may include encrypted verification data and a public cryptographic key generated by the customer as part of a cryptographic key pair generation process and that is to be used in the creation of the digital certificate 404. The certificate authority may identify a validity period for the digital certificate 404 and specify this validity period using one or more fields of the digital certificate 404. If the certificate authority successfully authenticates the customer, the certificate authority may digitally sign the digital certificate 404 and provide the digital certificate 404 to the customer to fulfill the digital certificate signing request.

In some instances, the digital certificate 404 may be generated by an unauthorized user to imitate a network-connected device and gain access to computing resources provided by one or more computing resource services. For instance, the unauthorized user may hack or otherwise breach into a certificate authority to generate its own digital certificates. The digital certificate 404 may be similar in structure to an authentic digital certificate (e.g., the digital certificate 404 may be a X.509 certificate, include the same fields as an authentic digital certificate, etc.). The digital certificate 404 may include one or more parameters that do not match the commonly used parameters of authentic digital certificates used by authorized certificate authority operators in generating the digital certificates in response to authenticated requests from the network-connected device and/or customers of the network-connected device service that maintain the network-connected device.

The certificate processing module 402 may obtain (e.g., receives over a communications network or over another communications channel) the digital certificate 404 purportedly from a network-connected device. The certificate processing module 402 may evaluate the digital certificate 404 provided by the network-connected device or from an unauthorized user to identify a set of parameters of the digital certificate 404. For instance, the certificate processing module 402 may extract, from the digital certificate 404, the size of the digital certificate serial number, the number of fields in the digital certificate's subject name, the name of the fields in the digital certificate's subject name, the validity duration of the digital certificate, the cryptographic key algorithm used for generating the digital signature of the digital certificate, the cryptographic key algorithm used for the public cryptographic key of the digital certificate, the size of the public cryptographic key, the size of the common name of the digital certificate, the type of characters included in the common name of the digital certificate, the number of extension records in the digital certificate, the names of the extension records, and the names/values of fields in the extension records. The certificate processing module 402 may utilize these parameters to generate a characteristic profile of the digital certificate 404.

If the certificate processing module 402 determines that the digital certificate 404 is valid for use based on information specified in the digital certificate 404 and from a customer account associated with the request, the certificate processing module 402 may provide the characteristic profile of the digital certificate 404 to a cluster management module 406 for classifying the digital certificate 404 into a digital certificate cluster. The cluster management module 406 may access the account of the customer associated with the network-connected device to identify a set of digital certificate clusters associated with the account. In an embodiment, the cluster management module 406 accesses a customer account to identify any preferences for digital certificate parameters that are to be excluded from consideration or whose importance may be diminished in classifying digital certificates to any of the digital certificate clusters. For instance, the customer account may specify a threshold distance for each parameter of the digital certificate 404 and the parameters of the digital certificate clusters. In some instances, the cluster management module 406 may compare the public cryptographic key size of the digital certificate 404 to the public cryptographic key size for a particular digital certificate cluster to determine a size difference. If the size difference is less than a threshold value, the cluster management module 406 may determine that the public cryptographic key size of the digital certificate 404 is close enough to the public cryptographic key size for the particular digital certificate cluster, which may cause the cluster management module 406 to utilize this determination to determine whether to classify the digital certificate 404 as being part of the digital certificate cluster. As another example, the cluster management module 406 may compare the serial number of the digital certificate 404 and the serial number specific to a digital certificate cluster to determine whether distance between these serial numbers is less than a threshold value corresponding to a maximum distance between serial numbers permitted for the cluster.

The cluster management module 406 may evaluate the characteristic profile of the digital certificate 404 to determine whether any digital certificate cluster corresponds to the parameters of the digital certificate 404. If the cluster management module 406 identifies a digital certificate cluster corresponding to the parameters of the digital certificate 404, the cluster management module 406 may classify the digital certificate 404 as being part of the digital certificate cluster. In an embodiment, if the digital certificate 404 does not correspond to any of the existing digital certificate clusters identified by the cluster management module 406, the cluster management module 406 may generate a new digital certificate cluster corresponding to the characteristic profile of the digital certificate 404. This enables classification of the digital certificate 404 with the newly generated digital certificate cluster.

Figure 5:
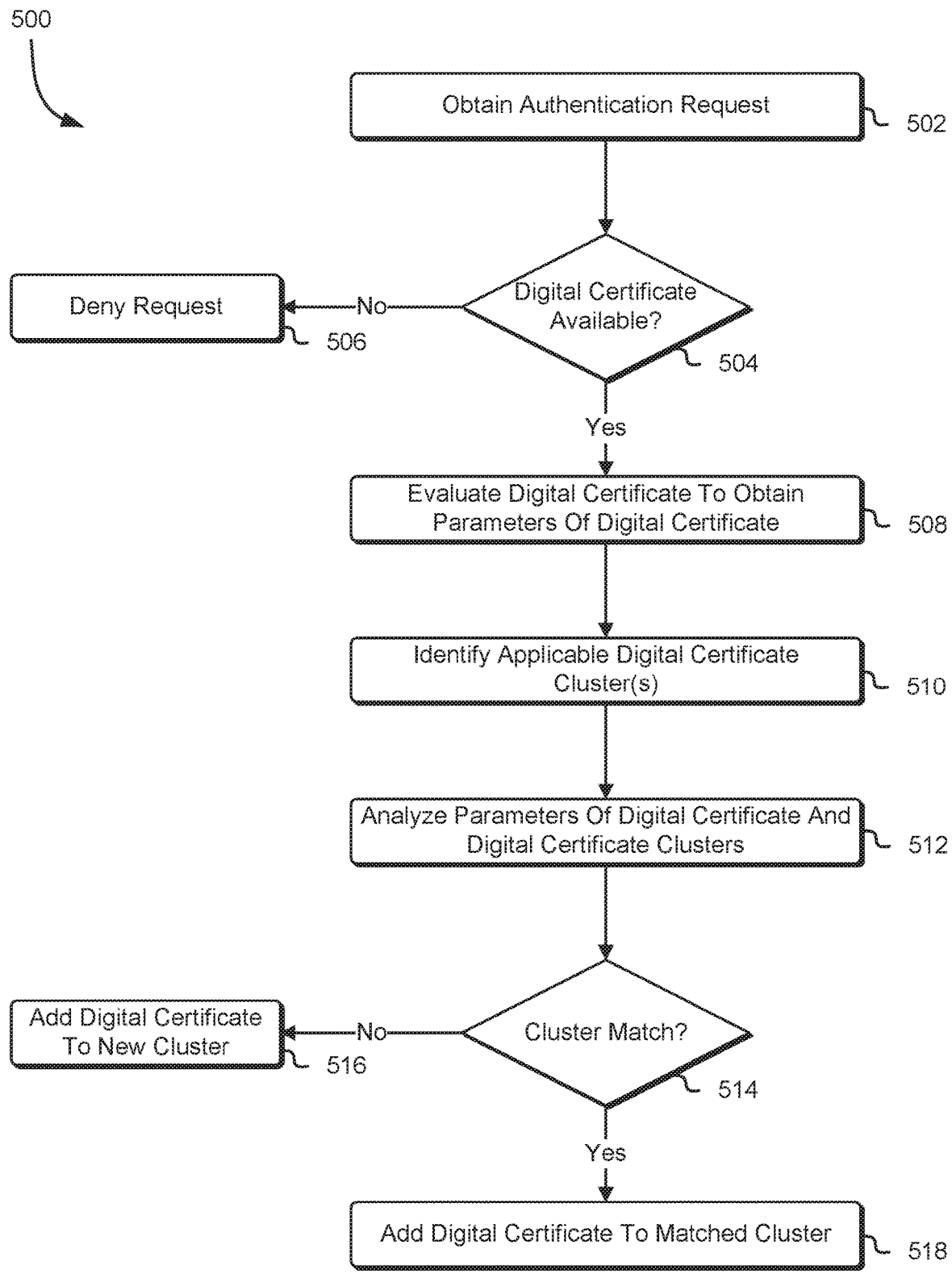
FIG. 5 shows an illustrative example of a process for evaluating a digital certificate to identify a set of parameters usable to classify the digital certificate within a cluster in accordance with at least one embodiment.

As noted above, a network-connected device service may receive an authentication request from a network-connected device or from an unauthorized user purporting to be the network-connected device. The request may include a digital certificate issued via a certificate authority. In some instances, the certificate authority may be compromised such that unauthorized users may utilize the certificate authority to generate anomalous digital certificates usable to imitate a network-connected device. The network-connected device service may classify the digital certificate into a digital certificate cluster based on the parameters of the digital certificate. Through evaluation of digital certificate clusters for an account, the network-connected device service may determine whether a digital certificate is suspect. Accordingly, FIG. 5 shows an illustrative example of a process 500 for evaluating a digital certificate to identify a set of parameters usable to classify the digital certificate within a cluster in accordance with at least one embodiment. The process 500 may be performed by the network-connected device service via the certificate processing module and the cluster management module described above.

At any time, the network-connected device service may obtain 502 an authentication request from a network-connected device or from an unauthorized user purporting to be the network-connected device. The authentication request may specify an identifier of the network-connected device or other information usable to identify a customer account associated with the network-connected device. In some embodiments, the authentication request includes a digital certificate or an identifier of a digital certificate usable to authenticate the network-connected device. For instance, the network-connected device service may evaluate the digital certificate to determine if the digital certificate specifies, as its subject, an identifier for the customer or the network-connected device. The network-connected device service may also evaluate the digital certificate to determine if the digital certificate itself is valid and that the issuer of the certificate is a trusted certificate authority. The network-connected device service may also evaluate the digital certificate to determine whether it has expired. The digital certificate may also include a field that specifies a "not before" date. If the digital certificate specifies a "not before" date that is after the date at which the network-connected device service has received the digital certificate, the network-connected device service may determine that the digital certificate cannot be used for authentication, as the digital certificate has not become active for use. Thus, the digital certificate may be necessary for the network-connected device service to determine whether the request can be processed.

In response to the request, the network-connected device service may determine 504 whether the digital certificate specified in the authentication request is available. As noted above, the authentication request may include the digital certificate. Alternatively, the authentication request may specify an identifier corresponding to a digital certificate maintained in a customer account that may have been previously provided by the customer or the network-connected device. The network-connected device service may access the customer account to determine whether a digital certificate corresponding to the provided identifier is available for use. If the authentication request does not include a digital certificate and otherwise does not provide an indication of a valid digital certificate that may be used to process the authentication request, the network-connected device service may deny 506 the authentication request.

If a digital certificate is available for processing the authentication request, the network-connected device service may evaluate 508 the digital certificate to obtain a set of parameters of the digital certificate. As noted above, these parameters may include the size of the digital certificate serial number, the number of fields in the digital certificate's subject name, the name of the fields in the digital certificate's subject name, the validity duration of the digital certificate, the cryptographic key algorithm used for generating the digital signature of the digital certificate, the cryptographic key algorithm used for the public cryptographic key of the digital certificate, the size of the public cryptographic key, the size of the common name of the digital certificate, the type of characters included in the common name of the digital certificate, the number of extension records in the digital certificate, the names of the extension records, and the names/values of fields in the extension records. These parameters may create unique characteristics for issued digital certificates which may be shared at least across a group of digital certificates provisioned for the same network-connected device fleet.

The network-connected device service may also identify 510 any applicable digital certificate clusters associated with the customer account that may be used to classify the digital certificate based on its parameters. As noted above, the network-connected device service may generate a set of digital certificate clusters for each customer of the network-connected device service and at multiple levels of organization, account, region, certificate authority, network-connected device group, network-connected device type, and the like. Each digital certificate cluster may be specific to a particular combination of parameters of a digital certificate observed by the network-connected device service.

The network-connected device service may analyze 512 the characteristic profile of the digital certificate (e.g., the parameters of the digital certificate) to determine 514 whether any digital certificate cluster corresponds to the parameters of the digital certificate. If the network-connected device service identifies a digital certificate cluster corresponding to the parameters of the digital certificate, the network-connected device service may add 518 (e.g., classify) the digital certificate as being part of the digital certificate cluster. In some instances, if the network-connected device service utilizes one or more clustering algorithms to generate and maintain the various digital certificate clusters, the network-connected device service may utilize these one or more clustering algorithms to identify a digital certificate cluster for the digital certificate even if the parameters of the digital certificate do not exactly match those of a particular digital certificate cluster. In an embodiment, if the digital certificate does not correspond to any of the existing digital certificate clusters identified by the network-connected device service, the network-connected device service may generate a new digital certificate cluster corresponding to the characteristic profile of the digital certificate. The network-connected device service may add 516 the digital certificate to the newly generated digital certificate cluster.

Figure 6:
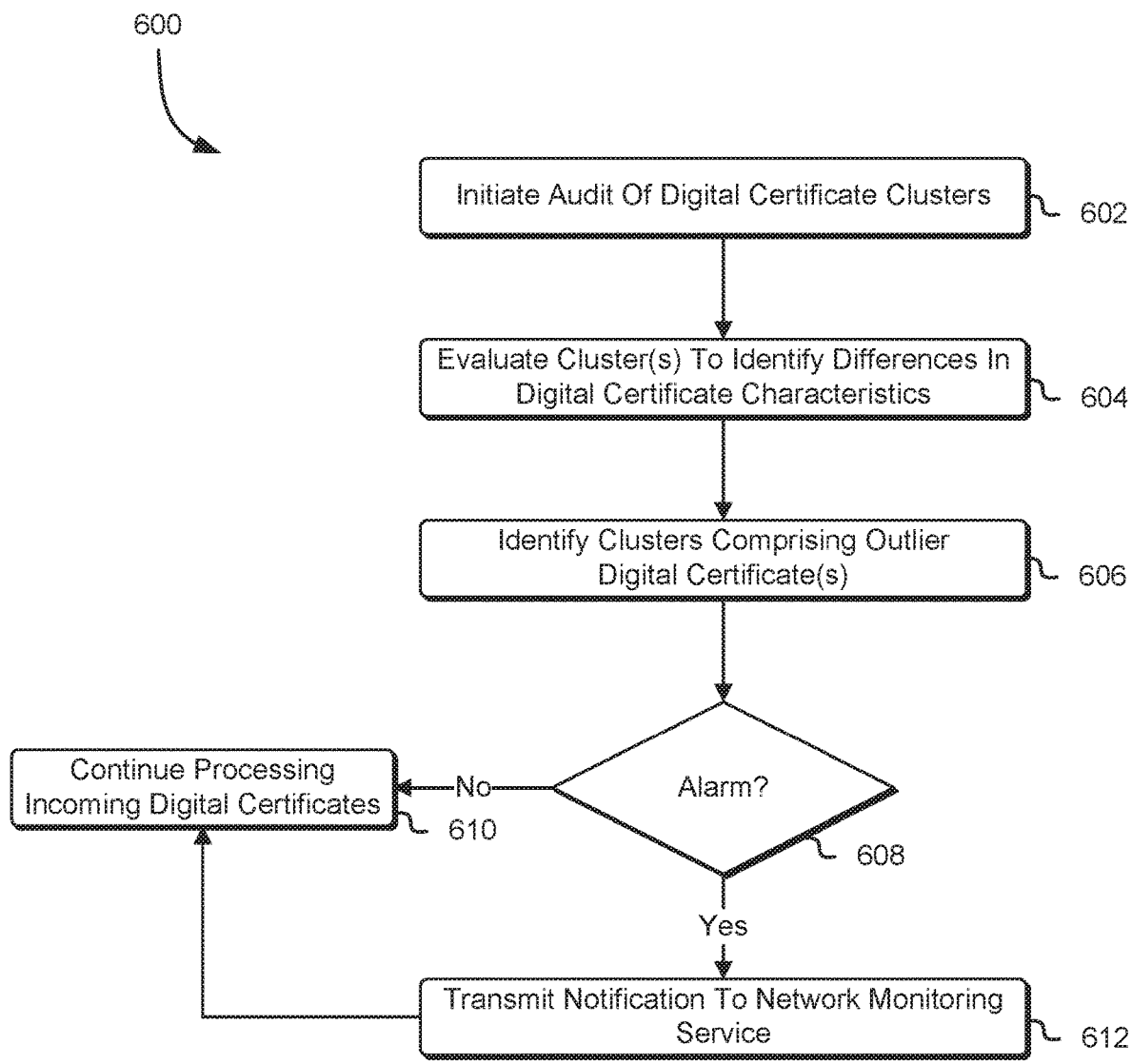
FIG. 6 shows an illustrative example of a process for auditing digital certificate clusters to identify clusters comprising outlier digital certificates in accordance with at least one embodiment.

As noted above, the network-connected device service may perform an audit of the digital certificate clusters associated with an account or another organizational unit to identify any digital certificate clusters corresponding to anomalous digital certificates. These digital certificate clusters may correspond to a set of parameters that have not been frequently encountered by the network-connected device service over a period of time. For instance, an anomalous digital certificate may be encountered at a rate that is significantly lower than other digital certificates associated with the account. The identification of a digital certificate cluster corresponding to an anomalous digital certificate may serve as an indication that the anomalous digital certificate may have been generated by an unauthorized user or that the certificate authority that issued the digital certificate has been compromised. If the network-connected device service determines that an anomalous digital certificate may have been created by an unauthorized user or by a compromised certificate authority, the network-connected device service may transmit a notification to a network monitoring service to address the potential breach. Accordingly, FIG. 6 shows an illustrative example of a process 600 for auditing digital certificate clusters to identify clusters comprising outlier digital certificates in accordance with at least one embodiment. The process 600 may be performed by the network-connected device service via the cluster auditing module described above.

The network-connected device service may initiate 602 an audit of a set of digital certificate clusters for a customer account or other organizational unit. As noted above, a baseline for the digital certificate clusters may be established over an initial period of time during which usage data is obtained for different digital certificates obtained by the network-connected device service from various network-connected devices. Alternatively, the baseline for the digital certificate clusters may be obtained based on prior usage data gathered for use of digital certificates associated with a particular customer account of the network-connected device service. Once the initial digital certificate clusters have been established, the network-connected device service may initiate 602 an audit of the digital certificate clusters after a period of time has elapsed or in response to a triggering event (e.g., a threshold number of digital certificates corresponding to the account or other organizational unit is received and classified into digital certificate clusters, detection of a breach of the certificate authority that issues digital certificates for network-connected devices, etc.).

The network-connected device service may evaluate 604 the various digital certificate clusters to identify the differences in digital certificate characteristics. For instance, the network-connected device service may determine how many digital certificates have been processed over a period of time and classified into any of the digital certificate clusters encompassed in the audit. Further, the network-connected device service may determine the number of digital certificates encountered for each digital certificate cluster. As described above, each digital certificate cluster may correspond to a number of digital certificates processed by the network-connected device service that share at least a set of parameters among the digital certificates of the digital certificate cluster. Thus, each digital certificate cluster may correspond to a different set of parameters for digital certificates processed by the network-connected device service. In some embodiments, a customer of the network-connected device service can specify one or more digital certificate parameters that are to be excluded from consideration during an audit of the digital certificate clusters associated with the customer account. For instance, if a set of digital certificate clusters differ based on a parameter that the customer has indicated should be excluded or otherwise diminished in an audit of the digital certificate clusters, the network-connected device service may combine these digital certificate clusters during the audit.

Based on the evaluation of the digital certificate clusters, the network-connected device service may identify 606 any digital certificate clusters comprising outlier (e.g., anomalous) digital certificates. As noted above, each digital certificate cluster may represent a count for digital certificates having certain parameters encountered by the network-connected device service. The network-connected device service may evaluate the digital certificate clusters to determine whether there are one or more digital certificate clusters having a low number of digital certificate incidences compared to other digital certificate clusters of the customer account. In an embodiment, the network-connected device service performs one or more mitigating actions to prevent a false positive result indicating detection of anomalous digital certificates. For instance, the network-connected device service may consider the number of digital certificate clusters and their relative sizes to establish a confidence level for detecting anomalous digital certificates. Additionally, or alternatively, the customer account may specify one or more preferences for identifying anomalous digital certificates. For example, a customer may specify, through the customer account, a threshold count for identifying digital certificate clusters associated with anomalous digital certificates. For instance, if the network-connected device service identifies a digital certificate cluster having a digital certificate count greater than the threshold count, the cluster auditing module may ignore this digital certificate cluster from its determination of anomalous digital certificates. The customer, via the customer account, may also specify digital certificate clusters and/or parameters that are to be excluded from the analysis performed by the network-connected device service.

If the network-connected device service identifies one or more digital certificate clusters corresponding to outlier (e.g., anomalous) digital certificates, the network-connected device service may determine 608 whether to trigger an alarm to indicate that digital certificates associated with these digital certificate clusters may have been provided by an unauthorized user or were otherwise generated via a breach of a certificate authority. As noted above, the network-connected device service may perform one or more mitigating actions to prevent a false positive result indicating detection of anomalous digital certificates. Thus, if the identified digital certificate clusters do not represent suspicious digital certificates obtained by the network-connected device service, the network-connected device service may continue 610 processing of incoming digital certificates and assigning these incoming digital certificates to corresponding digital certificate clusters.

However, if the network-connected device service determines that the digital certificates corresponding to the identified digital certificate clusters are anomalous and may be demonstrative of a potential breach of a certificate authority, the network-connected device service may transmit 612 a notification to a network monitoring service to perform one or more remedial actions to address the issue. The network monitoring service may evaluate the one or more anomalous digital certificates to identify a possible source of the breach of the certificate authority used to issue the anomalous digital certificates. Further, the network monitoring service may transmit a notification to a customer or other administrator of the account to indicate that the certificate authority utilized to issue digital certificates for the network-connected device and other network-connected devices of a fleet may be compromised. This enables the customer to perform remedial actions to address the breach. The network-connected device service may blacklist any digital certificates having the parameters of the anomalous digital certificates or that otherwise correspond to the identified digital certificate clusters. The network-connected device service may continue 610 to process incoming digital certificates as they are obtained and perform audits on the digital certificate clusters accordingly.

Figure 7:
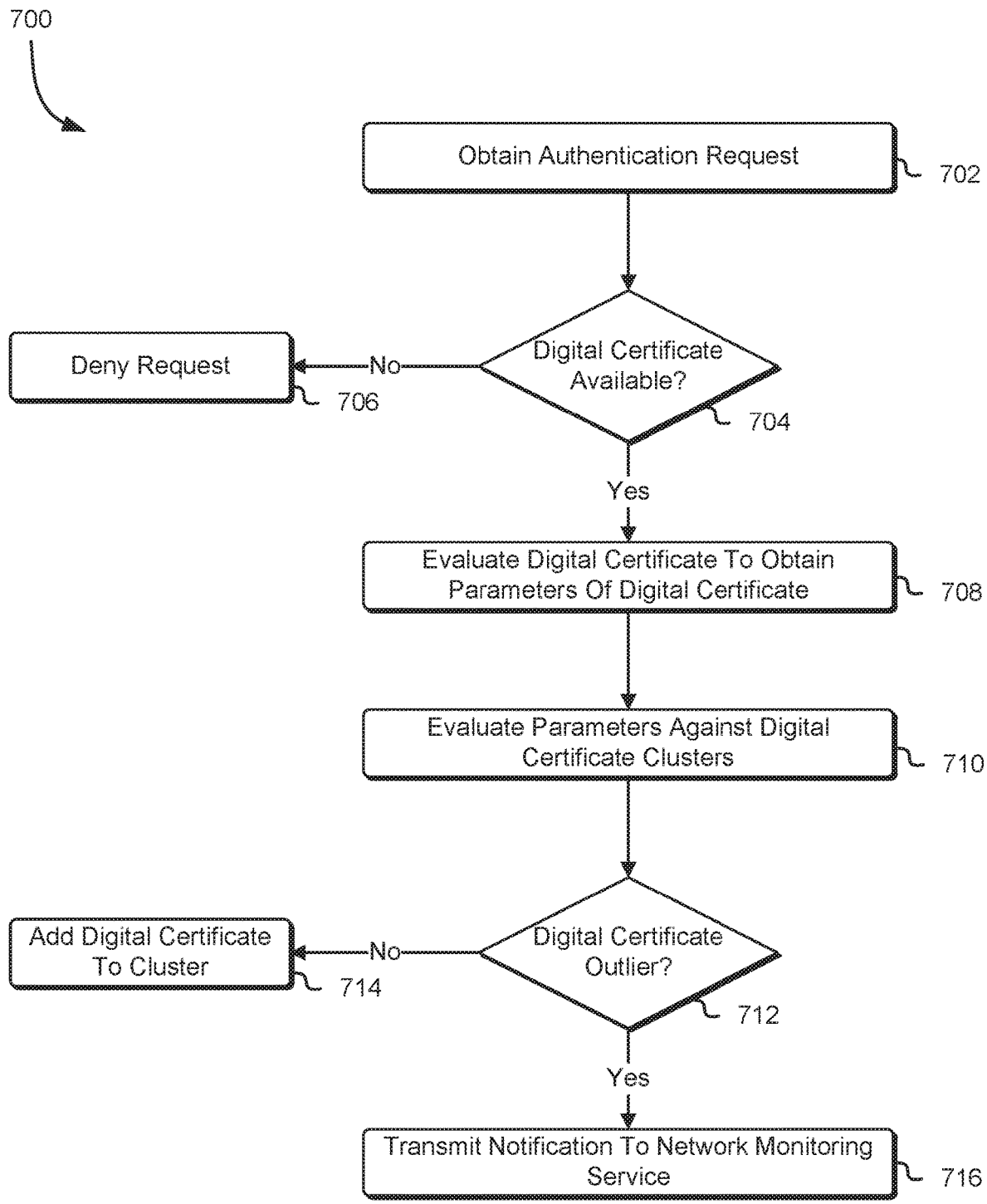
FIG. 7 shows an illustrative example of a process for evaluating a digital certificate to determine whether the digital certificate is an outlier compared to other digital certificates for a set of network-connected devices in accordance with at least one embodiment.

In an embodiment, the network-connected device service can evaluate a digital certificate, in response to an authentication request, to determine whether the digital certificate is suspect (e.g., is anomalous compared to other digital certificates processed by the network-connected device service for a particular account or other organizational unit). Thus, rather than classifying the digital certificate as being part of a particular digital certificate cluster and performing an audit, the network-connected device service may determine, in response to the authentication request, whether to initiate an alarm to indicate detection of an anomalous digital certificate that may be classified as potentially being from an unauthorized user or otherwise issued by a compromised certificate authority. Accordingly, FIG. 7 shows an illustrative example of a process 700 for evaluating a digital certificate to determine whether the digital certificate is an outlier compared to other digital certificates for a set of network-connected devices in accordance with at least one embodiment. The process 700 may be performed by the aforementioned network-connected device service via the certificate processing module and the cluster management module described above.

Similar to the process 500 described above in connection with FIG. 5, the network-connected device service may obtain 702 an authentication request from a network-connected device or from an unauthorized user purporting to be the network-connected device. The authentication request may specify an identifier of the network-connected device or other information usable to identify a customer account associated with the network-connected device. In response to the authentication request, the network-connected device service may determine 704 whether the digital certificate specified in the authentication request is available. If the authentication request does not include a digital certificate and otherwise does not provide an indication of a valid digital certificate that may be used to process the authentication request, the network-connected device service may deny 706 the authentication request.

If the digital certificate is available, the network-connected device service may evaluate 708 the digital certificate to obtain (e.g., extract from the digital certificate through evaluation of the digital certificate) a set of parameters of the digital certificate. As noted above, the set of parameters for each digital certificate may create unique characteristics for issued digital certificates which may be shared at least across a group of digital certificates provisioned for the same network-connected device fleet. Alternatively, if the digital certificate was generated by an unauthorized user or via a compromised certificate authority, the digital certificate may have a set of parameters that may be distinct from the set of parameters of other issued digital certificates.

The network-connected device service may evaluate 710 the set of parameters of the digital certificate identified in the authentication request against each of the digital certificate clusters maintained for the corresponding customer account or other organizational unit. As noted above, each digital certificate cluster may correspond to a particular set of parameters of digital certificates processed by the network-connected device service over time. Thus, the network-connected device service may compare the set of parameters of the digital certificate to the set of parameters of each digital certificate cluster to determine whether there is a match. If there is a match, then the digital certificate may be classified as being part of the digital certificate cluster. In an embodiment, the network-connected device service utilizes a clustering algorithm to identify a digital certificate cluster corresponding to a set of parameters that may be similar to the set of parameters of the digital certificate. Thus, while the set of parameters of the digital certificate may not exactly match the set of parameters of a particular digital certificate cluster, the clustering algorithm may allow for classification of the digital certificate as being part of the digital certificate cluster.

Based on this evaluation, the network-connected device service may determine 712 whether the digital certificate identified in the authentication request is an outlier (e.g., the set of parameters of the digital certificate correspond to a digital certificate cluster with a low incidence count, the set of parameters of the digital certificate do not correspond to any existing digital certificate cluster, etc.). If the network-connected device service determines that the digital certificate is not an outlier, the network-connected device service may add 714 the digital certificate to a digital certificate cluster corresponding to the set of parameters of the digital certificate or at least to a set of parameters similar to those of the digital certificate in accordance with the clustering algorithm utilized by the network-connected device service.

However, if the network-connected device service determines that the digital certificate is an outlier and either corresponds to an anomalous digital certificate cluster or to no other existing digital certificate cluster, the network-connected device service may transmit 716 a notification to the network monitoring service to perform one or more remedial actions to address the issue. As noted above, the network monitoring service may evaluate the digital certificate to identify a possible source of the breach of the certificate authority used to issue the digital certificate. Further, the network monitoring service may transmit a notification to a customer or other administrator of the account to indicate that the certificate authority utilized to issue the digital certificate may be compromised. In an embodiment, the network-connected device service can also add the digital certificate to the anomalous digital certificate cluster or generate a new digital certificate cluster corresponding to the set of parameters of the digital certificate. Thus, if other digital certificates are obtained that have the same or similar set of parameters, these other digital certificates may be identified as being anomalous.

Figure 8:
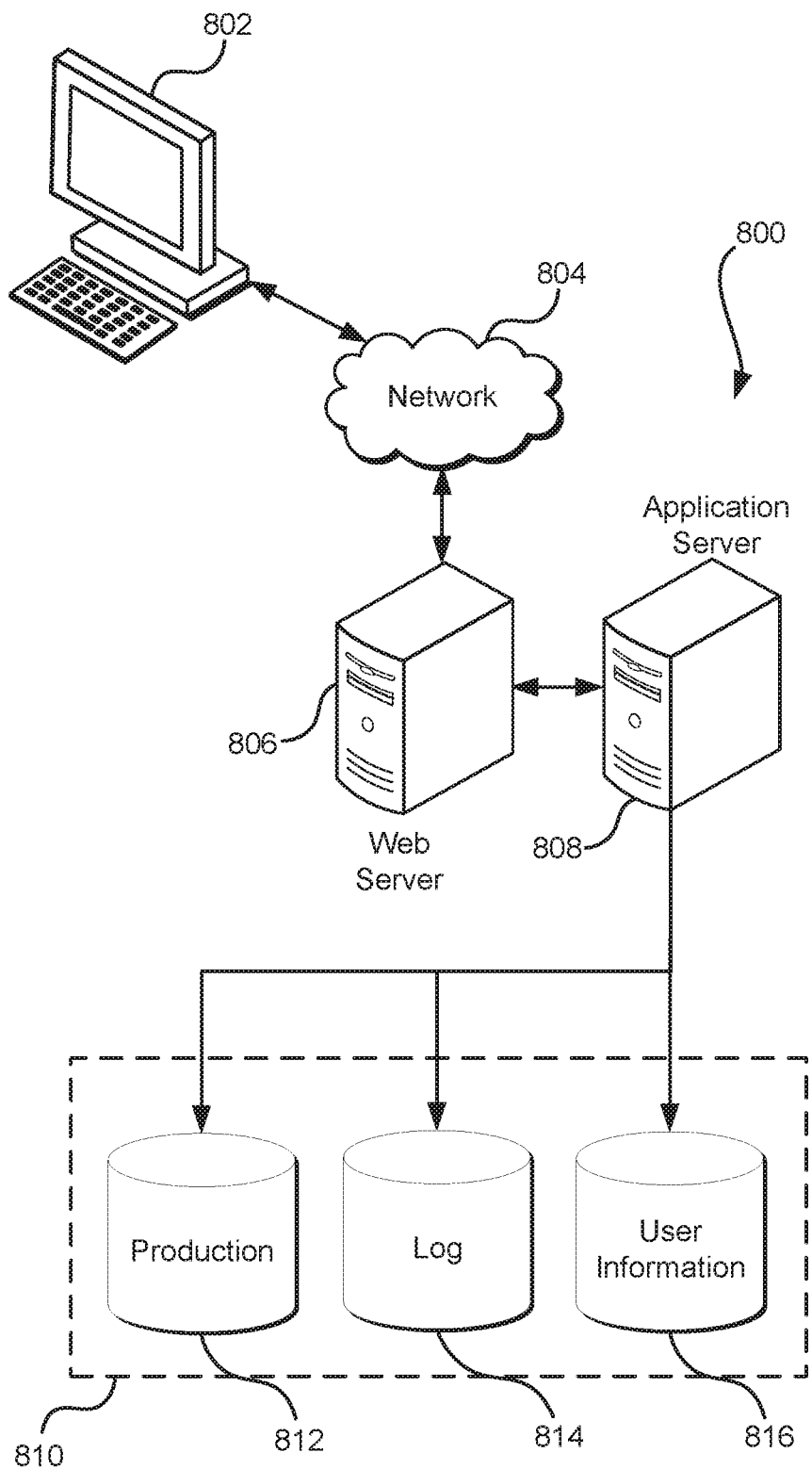
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JAVASCRIPT® programming language, Cascading Style Sheets ("CSS"), JAVASCRIPT® Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), PYTHON™ programming language, RUBY™ programming language, PERL™ programming language, JAVA® programming language, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, JAVA® servers, Apache servers, and business application servers. In an embodiment, the one or more servers are also capable of executing programs or scripts in response to requests from user devices, such as by executing one or more web applications that are implemented as one or more scripts or programs written in any programming language, such as JAVA® programming language, C, C # or C++, or any scripting language, such as RUBY™ programming language, PHP, PERL™ programming language, PYTHON™ programming language or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a network connected device service, a digital certificate of a network-connected device, the digital certificate usable by the network connected device service to authenticate the network-connected device, the digital certificate comprising a set of parameters;
   identifying, by the network connected device service, an identified digital certificate cluster of a set of digital certificate clusters associated with a customer of a plurality of customers of the network connected device service, the identified digital certificate cluster comprising one of a set of existing digital certificate clusters when the existing digital certificate cluster corresponds to the set of parameters of the digital certificate, the identified digital certificate cluster comprising a new digital certificate cluster when none of the set of existing digital certificate clusters corresponds to the set of parameters;
   adding, by the network connected device service, the digital certificate to the identified digital certificate cluster;
   as a result of an amount of digital certificates that are associated with an organizational unit exceeding a threshold, determining, by the network connected device service, that the digital certificate is anomalous based at least in part on a quantity of certificates in the identified digital certificate cluster, wherein the threshold is determined based at least in part on weights of individual parameters of the set of parameters that are specified by the customer; and
   as a result of determining that the digital certificate is anomalous, generating, by the network connected device service, information that indicates that the digital certificate is anomalous.

2. The computer-implemented method of claim 1, further comprising:
   adding, by the network connected device service, the digital certificate to a blocked list to prevent use of the digital certificate to authenticate the network-connected device.

3. The computer-implemented method of claim 1, wherein a clustering algorithm is used to identify the identified digital certificate cluster based on a distance between the set of parameters of the digital certificate and a set of parameters of the identified digital certificate cluster.

4. The computer-implemented method of claim 1, wherein the set of parameters includes a size of a serial number of the digital certificate.

5. A system, comprising:
   one or more processors; and
   memory storing computer-executable instructions that, if executed, cause the one or more processors to:
      receive, by a network connected device service, a digital certificate;
      determine a set of parameters of the digital certificate;
      identify, by the network connected device service, an identified digital certificate cluster of a set of digital certificate clusters associated with a customer of a plurality of customers of the network connected device service, the identified digital certificate cluster comprising a new digital certificate cluster or one of a set of existing digital certificate clusters based at least in part on the set of parameters of the digital certificate;
      add, by the network connected device service, the digital certificate to the identified digital certificate cluster;
      as a result of an amount of digital certificates in the set of digital certificate clusters exceeding a first threshold value, determine, by the network connected device service, that the digital certificate is anomalous based on a size of the identified digital certificate cluster and a quantity of certificates in the set of digital certificate clusters, wherein the threshold value is determined based at least in part on weights of individual parameters of the set of parameters that are specified by the customer; and perform a security operation as a result of the determination that the digital certificate is anomalous.

6. The system of claim 5, wherein the computer-executable instructions that cause the one or more processors to perform the security operation further cause the one or more processors to transmit a notification to a network monitoring service indicating that the digital certificate is anomalous.

7. The system of claim 5, wherein the digital certificate is a first digital certificate, the set of parameters is a first set of parameters, and the computer-executable instructions further cause the one or more processors to:

receive, by the network connected device service, a second digital certificate;

determine, by the network connected device service, a second set of parameters associated with the second digital certificate;

identify, by the network connected device service, a second digital certificate cluster corresponding to the second set of parameters;

determine, by the network connected device service, that a size of the second digital certificate cluster exceeds a second threshold value; and as a result of the size of the second digital certificate cluster exceeding the threshold value, determine that the second digital certificate is non-anomalous.

8. The system of claim 5, wherein the computer-executable instructions that cause the one or more processors to identify the identified digital certificate cluster further cause the one or more processors to:

utilize a clustering algorithm and the set of parameters to identify the identified digital certificate cluster; and update the identified digital certificate cluster to include the digital certificate based on the identification of the identified digital certificate cluster.

9. The system of claim 5, wherein the identified digital certificate cluster comprises a set of parameter values that correspond to values of fields specified in the digital certificate.

10. The system of claim 5, wherein the identified digital certificate cluster is associated with a fleet of network-connected devices of the customer.

11. The system of claim 5, wherein the set of parameters includes a number of extension records in the digital certificate.

12. The system of claim 5, wherein the set of parameters includes names and values of extension record fields in the digital certificate.

13. The system of claim 5, wherein the digital certificate is determined to be anomalous further as a result a breach of a certificate authority that issued the digital certificate being detected.

14. The system of claim 5, wherein:

the quantity is specified by the customer; and the size of the identified digital certificate cluster is determined based at least in part on the digital certificate being added to the digital certificate cluster.

15. A non-transitory computer-readable storage medium storing executable instructions that, as a result of being executed by one or more processors of a computer system, cause the computer system to at least:

as a result of evaluating a set of parameters of a digital certificate, identify by a network connected device service, an identified digital certificate cluster that is associated with a customer of a plurality of customers of the network connected device service, the identified digital certificate cluster comprising one of a set of existing digital certificate clusters when the existing digital certificate cluster corresponds to the set of parameters, the identified digital certificate cluster comprising a new digital certificate cluster when none of the set of existing digital certificate clusters corresponds to the set of parameters;

add, by the network connected device service, the digital certificate to the identified digital certificate cluster;

determine, by the network connected device service, an anomalous certificate confidence score based on a quantity of certificates in the identified digital certificate cluster and a size of the identified digital certificate cluster;

as a result of an amount of digital certificates that are associated with the customer exceeding a first threshold value, determine, by the network connected device service, that the digital certificate is anomalous based on the anomalous certificate confidence score; and perform, by the network connected device service, a security operation as a result of the determination that the digital certificate is anomalous, wherein the first threshold value is determined based at least in part on weights of individual parameters of the set of parameters that are specified by the customer.

16. The non-transitory computer-readable storage medium of claim 15, wherein the digital certificate is specified in a request to authenticate a network-connected device associated with the customer.

17. The non-transitory computer-readable storage medium of claim 15, wherein the set of parameters comprises values of fields of X.509 digital certificates.

18. The non-transitory computer-readable storage medium of claim 15, wherein the executable instructions that cause the computer system to perform the security operation further cause the computer system to add the digital certificate to a certificate revocation list.

19. The non-transitory computer-readable storage medium of claim 15, wherein the identified digital certificate cluster is a first digital certificate cluster, and the executable instructions that cause the computer system to identify the identified digital certificate cluster further cause the computer system to determine that the set of parameters of the digital certificate corresponds to a second digital certificate cluster.

20. The non-transitory computer-readable storage medium of claim 15, wherein the executable instructions that cause the computer system to determine that the digital certificate is anomalous further cause the computer system to:

determine, by the network connected device service, the size of the identified digital certificate cluster; and determine, by the network connected device service, that the size of the identified digital certificate cluster is below a second threshold value based at least in part on a second size corresponding to digital certificate clusters associated with non-anomalous digital certificates.

21. The non-transitory computer-readable storage medium of claim 15, wherein the executable instructions further cause the computer system to update the identified digital certificate cluster to indicate processing of the digital certificate.

22. The non-transitory computer-readable storage medium of claim 15, wherein the identified digital certificate cluster corresponds to a certificate authority that issued the digital certificate.

\* \* \* \* \*